US006637121B2

(12) United States Patent
Barefoot

(10) Patent No.: US 6,637,121 B2
(45) Date of Patent: Oct. 28, 2003

(54) INTERNAL WELD PROFILE GAUGE

(76) Inventor: Byron G. Barefoot, 14006 Fitzwater Dr., Nokesville, VA (US) 20181

( * ) Notice: Subject to any disclaimer, the term of this patent is extended or adjusted under 35 U.S.C. 154(b) by 38 days.

(21) Appl. No.: 10/036,533

(22) Filed: Jan. 7, 2002

(65) Prior Publication Data
US 2003/0126753 A1 Jul. 10, 2003

(51) Int. Cl.$^7$ .............................. G01B 3/50; G01B 3/42; G01B 3/14
(52) U.S. Cl. .................. 33/501.45; 33/833; 33/501.08; 33/555.2; 33/562
(58) Field of Search .......................... 33/412, 832, 833, 33/836, 501.08, 501.09, 501.45, 535, 555.2, 562, 563, 566

(56) References Cited

U.S. PATENT DOCUMENTS

| | | | | | |
|---|---|---|---|---|---|
| 1,881,651 A | * | 10/1932 | Judge | ............................ | 33/562 |
| 2,389,842 A | * | 11/1945 | Cummins | ...................... | 33/833 |
| 2,603,872 A | * | 7/1952 | Jones | ........................ | 33/555.1 |
| 3,381,385 A | * | 5/1968 | Wilber | ......................... | 33/563 |
| 3,597,848 A | * | 8/1971 | Matson | ......................... | 33/833 |
| 3,664,029 A | * | 5/1972 | Glucoft et al. | ................. | 33/412 |
| 4,103,428 A | * | 8/1978 | Guzick | ......................... | 33/412 |
| 4,255,860 A | * | 3/1981 | Ragettli | ....................... | 33/501 |
| 4,485,558 A | * | 12/1984 | Lycan et al. | ................... | 33/833 |
| 4,637,142 A | * | 1/1987 | Baker | ........................... | 33/833 |
| 4,936,019 A | * | 6/1990 | Hirsch | .......................... | 33/562 |
| 5,285,578 A | * | 2/1994 | Sovereen | ................. | 33/501.08 |
| 5,444,921 A | * | 8/1995 | Milina | .......................... | 33/833 |
| 5,459,936 A | * | 10/1995 | Stange | ......................... | 33/563 |
| 5,611,149 A | * | 3/1997 | Fujiwara | ....................... | 33/833 |

* cited by examiner

Primary Examiner—Diego Gutierrez
Assistant Examiner—Madeline Gonzalez
(74) Attorney, Agent, or Firm—McGuireWoods LLP

(57) ABSTRACT

A tool for inspecting and verifying weld beads in a pipeline includes a plate-like structure which has a surface and edges adapted for inspecting and verifying various weld bead attributes. The surface is imprinted with several identification marks, including for example, wall thicknesses and ratios of weld bead width to wall thickness. The tool can be used to verify weld bead convexity, weld bead concavity, and weld bead width for many different wall thicknesses. The tool is capable of verifying weld bead width and axial alignment of successive sections of pipe along the pipeline. All verifications and measurements are visual and tactile, without need for complex machinery or calculations, and can be accomplished with a single, lightweight tool. Additionally, a single tool can be used to verify weld beads for a variety of different pipe thicknesses.

41 Claims, 11 Drawing Sheets

VISUAL REFERENCE OF ACCEPTANCE WITHIN MAXIMUM VARIATION OF WELD BEAD

INTERNAL WELD PROFILE GAUGE

BACKGROUND OF THE INVENTION

1. Field of the Invention

The present invention relates generally to a measurement device and, more particularly, to a measuring device for inspecting and verifying weld profiles on a pipe.

2. Background Description

Gas tungsten arc welding is used in many different applications to make welds for piping systems. For example, gas tungsten arc welding is used in clean rooms to make welds on pipelines that supply various fluids and gases to the equipment in the clean rooms. One such clean room is for the manufacturing of semiconductor chips and other similar components.

At the present time, many proposed standards are being devised in order to ensure that gas tungsten arc welding meets certain minimum requirements in the clean room and semiconductor environment. These standards will ensure that semiconductor manufacturing applications, for example, operate at peak efficiency. In particular, SEMI™ GTA (gas tungsten arc) task force is currently devising weld standards and tolerances for the gas tungsten arc welds used in semiconductor manufacturing applications. More specifically, SEMI is setting standards for maximum and minimum weld bead convexity, concavity, and width, and maximum and minimum offset from perfect axial alignment of successive pipes in the pipeline.

It is currently theorized that if a weld does not conform to certain tolerances, gas flow over the weld bead will be disturbed potentially resulting in a Venturi effect. The Venturi effect results in a pressure differential over the weld, which, in turn, causes a moisture buildup at the weld bead. This moisture buildup will cause corrosion in the pipe thus introducing impurities into the system. These impurities will reduce semiconductor yield thus causing a reduced manufacturing yield, as well as affecting the integrity of the weld. The same problems occur when successive pipes along the pipeline are axially misaligned. Thus, it is imperative that all welds are within certain strict tolerances so as to minimize yield loss due to misalignment of pipes as well as improper weld beads.

To ensure that the weld bead is within certain tolerances, the welder will make periodic sample welds, or coupons, on the pipeline. A longitudinal cross section of the pipeline will then be cut in order for the welder to measure the weld parameters. That is, the welder will inspect the coupons for penetration, bead concavity, bead variation, oxidation and other variables. These coupons and observations, along with the known diameter and other dimensions of the tungsten tip and pipe, itself, are then used to calibrate the welding machine. Thereafter, the welder can begin the welding process using the calibrated welding machine.

However, in order to measure the weld parameters the welder must use complex and cumbersome devices, even using complex mathematical formulas based on the diameter and wall thickness of the pipe. For example, U.S. Pat. No. 2,603,872 to Jones teaches a gauge for measuring curvature, and a standard micrometer can be used to measure the width of the weld bead. However, these devices are mechanically cumbersome and require complex calculations or manipulations to arrive at a meaningful result. Furthermore, the actual numerical measurement of the weld bead is not as important to the welder as being within certain weld tolerances based on many variables including, for example, the different multipliers multiplied by the pipe wall thickness. Thus, the prior art devices tend to provide irrelevant data to the welder.

Additionally, existing devices are capable of inspecting and verifying only one aspect of the weld bead at a time, thereby requiring the welder to carry multiple cumbersome devices. Consequently, the welder cannot employ existing devices simply and rapidly. Similar problems exist with respect to devices for use in verifying axial alignment of pipes, such as the device shown in U.S. Pat. No. 4,255,860 to Ragettli.

SUMMARY OF THE INVENTION

It is an object of the present invention to provide a tool capable of measuring an internal weld bead.

It is a further object of the present invention to provide a tool capable of verifying that an internal weld bead is within proper tolerances without providing irrelevant and complex numerical data to the user.

It is another object of the present invention to provide a convenient, lightweight, and simple tool that a welder can use to rapidly verify that an internal weld bead is within proper tolerances with respect to the characteristics of bead concavity, bead convexity, bead width, and pipe axial alignment.

It is still another object of the present invention to provide a tool capable of verifying that an internal weld bead is within proper bead concavity, bead convexity, and bead width tolerances for several wall thicknesses.

In one aspect of the present invention, a tool is provided for inspecting and verifying weld beads in a pipeline. The tool is a plate that has a surface and several edges. The surface is imprinted with several identification marks for example, wall thickness and maximum and minimum ratios of weld bead width to wall thickness. The edges of the tool are adapted for inspection and verification of weld beads via fixed maximum and minimum measuring structures integrated with the tool's edges. The tool can be used to verify weld bead convexity, concavity, and width for different wall thicknesses. Concavity is verified through a tooth or a nub protruding from one edge of the tool, convexity through a notch cut into another edge of the tool, and bead width through a gap and tab located along yet another edge of the tool. The tool may also be adapted to weld bead width variation and axial alignment of the welded pipe.

BRIEF DESCRIPTION OF THE DRAWINGS

Further advantages of the present invention will be apparent from the description below with reference to the accompanying drawings in which like numbers indicate like elements.

DETAILED DESCRIPTION OF THE PREFERRED EMBODIMENTS OF THE INVENTION

The present invention is directed towards a tool capable of measuring different weld bead and pipe parameters. The tool allows for a considerable reduction in the number and weight of tools required to inspect and verify an internal weld. Furthermore, the tool eliminates the need for complex mechanisms or calculations and makes the inspection and verification process purely visual and tactile. This greatly simplifies the weld inspection and verification process.

Figure 1:
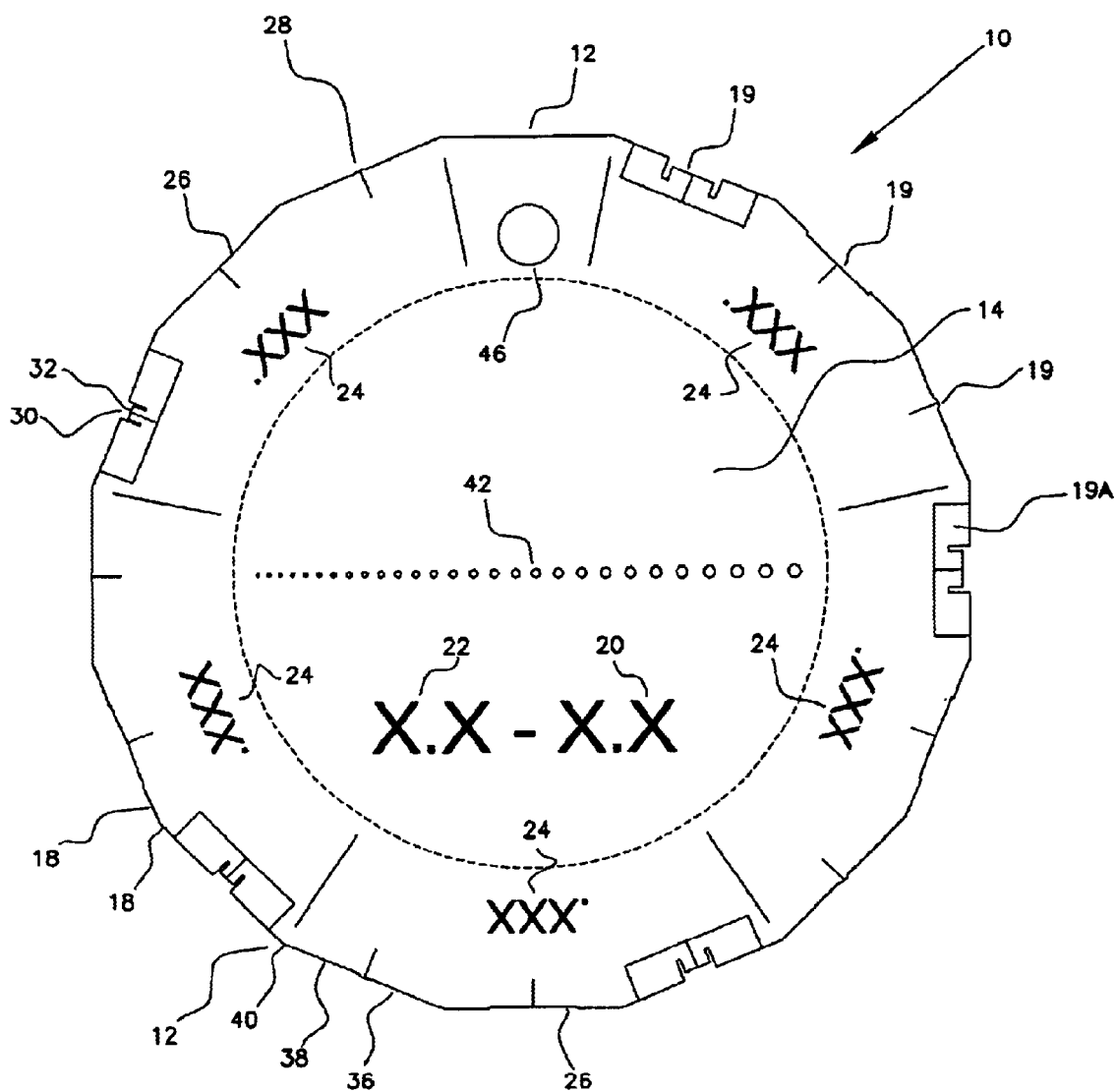
FIG. 1 is a top plan view of a first embodiment of the measuring and inspection tool of the present invention.

Referring now to FIG. 1, a tool generally depicted as reference numeral 10 is provided for inspecting and verifying internal weld beads. In one exemplary embodiment, the tool 10 is shown as a plate 12 with first and second opposing surfaces 14 and edges 18. Edges 18 are adapted for inspecting and verifying various characteristics of a weld bead by integrating a fixed measurement structure 19 (maximum and minimum measurement structure) with edge 18. In the embodiments of the invention, surface 14 of plate 12 is imprinted by any known means with a maximum bead width multiplier 20, a minimum bead width multiplier 22, and one or more wall thickness numerals 24 corresponding to different pipe wall thicknesses of the pipe. Additional indicia may be imprinted on opposing surface 14. At least one edge 18 with integrated fixed maximum and minimum measurement structure 19 is associated with each wall thickness numeral 24. The measurement structure 19 may be associated with a predetermined job site specification or a known maximum and minimum multiplier.

In the embodiment of the invention illustrated by FIG. 1, surface 14 is imprinted with five wall thickness numerals 24, and each wall thickness numeral 24 is associated with three edges 18 adapted with integrated fixed maximum and minimum measurement structures 19, so that plate 12 has sixteen edges 18 and is substantially circular in shape. It should be understood by those of ordinary skill in the art, however, that each wall thickness numeral 24 may equally be associated with one or two integrated fixed maximum and minimum measurement structures 19. Also, tool 10 may be other shapes such as square, rectangular or other polygonal shape, depending on the integrated fixed maximum and minimum measurement structures 19. See, for example, FIG. 5 which shows a rectangular shaped tool.

In the embodiment of FIG. 1, tool 10 can be used to inspect and verify three weld characteristics. The embodiments of the invention, distinguished from each other by their maximum and minimum bead width multipliers 20 and 22, respectively, or a predetermined job site specification, are adapted to inspect and verify bead convexity, bead concavity, and bead width for five different wall thicknesses. For example, the exploded view of FIG. 2 shows a fixed maximum measurement structure 19 to verify that the convexity of the weld bead is within the proper tolerances.

Figure 2:
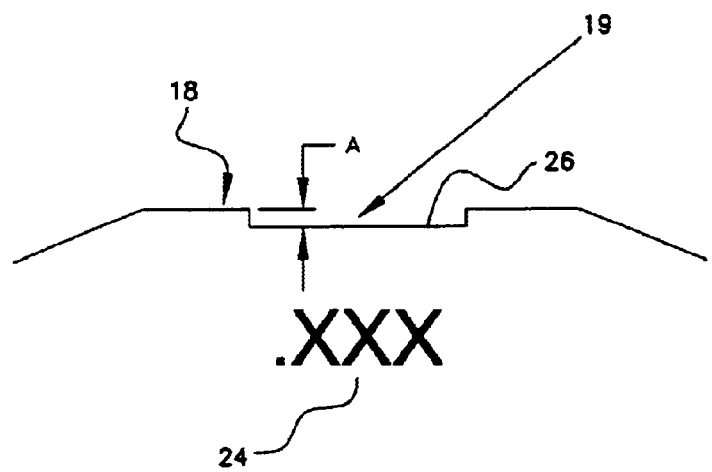
FIG. 2 is an exploded view of a notch for determining convexity of the weld beads.
Figure 3:
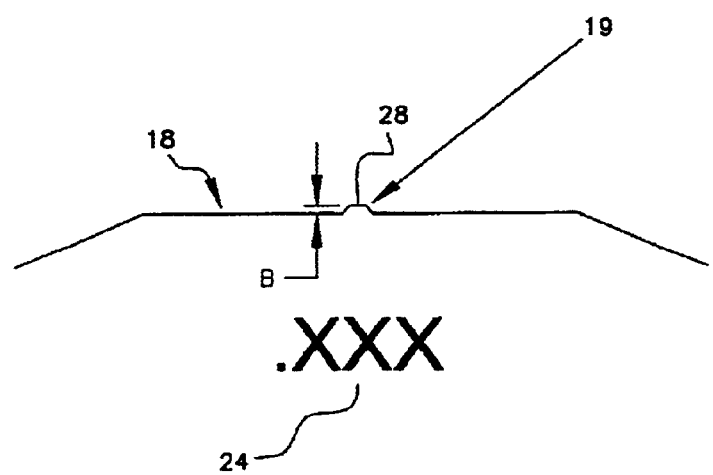
FIG. 3 is an exploded view of a tooth for determining concavity of the weld beads.
Figure 4:
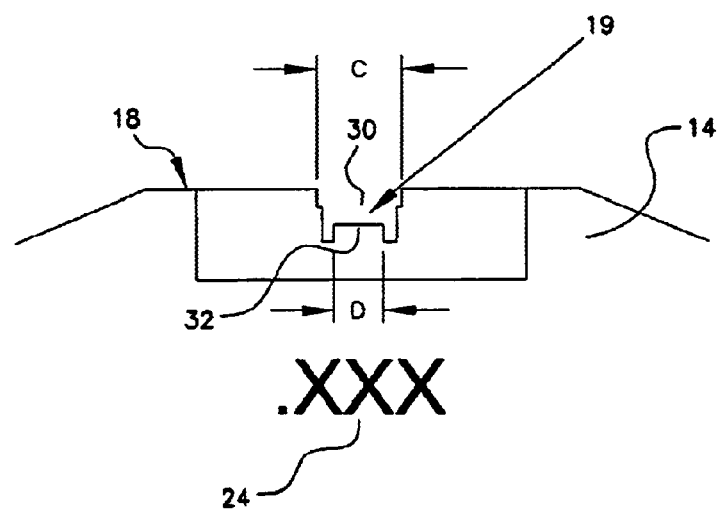
FIG. 4 is an exploded view of a gap and tab for determining width of the weld beads.

FIGS. 2–4 show three different fixed maximum and minimum measurement structures 19 adapted for use with the present invention. In FIG. 2, a fixed maximum convexity measuring device is shown. A notch 26 is cut into edge 18 in order to verify that the convexity of the weld bead is within proper tolerances (i.e., the convexity of the weld bead has not exceeded a maximum defined convexity). In an embodiment of the invention, the depth "a" of notch 26 is substantially equal to ten percent of the wall thickness numeral 24 associated with edge 18; however, other depths are also contemplated by the present invention such as, for example, a fixed number defined by a job specification.

In use, the notch 26 is placed over the internal weld bead. The weld bead is within tolerance if tool 10 does not rock (i.e., remains stationary). On the other hand, the weld bead is not within tolerance if tool 10 rocks (i.e., is not stationary). The latter scenario shows that the convexity of the weld bead projects higher than substantially 10% of the wall thickness. In this manner, the welder can quickly and easily determine whether the convexity of the weld bead is within the proper tolerances.

FIG. 3 shows a fixed maximum device for verifying the concavity of the internal weld bead. In FIG. 3, a tooth 28 protrudes from edge 18 by dimension "b." In the embodiment of the invention, dimension "b" is substantially equal to ten percent of the wall thickness numeral 24 associated with edge 18; however, other dimensions are also contemplated by the present invention. For example, it is also contemplated that tooth 28 will have dimension "b" of one one-thousandth (1/1000) of an inch to detect the presence of any concavity in the weld bead.

In use, the tooth 28 is placed over the weld bead. The weld bead is within tolerance if tool 10 rocks (i.e., is not stationary). On the other hand, the weld bead is not within tolerance if tool 10 does not rock (i.e., remains stationary). The latter scenario shows that the concavity of the internal weld bead is at a depth lower than substantially 10% of the wall thickness or other predefined measurement. In this manner, the welder can quickly and easily determine whether the concavity of the weld bead is within proper tolerances.

FIG. 4 illustrates the integrated fixed maximum and minimum measurement structure 19 used to verify a width of the internal weld bead. A gap 30 and a tab 32 are disposed along edge 18. The width of gap 30, indicated by dimension "c," is substantially equal to the associated wall thickness numeral 24 multiplied by maximum bead multiplier 20. Accordingly, the dimension "c" represents the maximum allowable bead width. The width of tab 32, indicated by dimension "d," is substantially equal to the associated wall thickness numeral 24 multiplied by minimum bead multiplier 22. Accordingly, the dimension "d" represents the minimum allowable bead width. The width of gap 30 and tab 32 (e.g., dimensions "c" and "d") may also be based on a fixed number defined by a job specification.

In use, by placing gap 30 and tab 32 over the weld bead, the welder can ensure that the bead width is within the proper tolerances. That is, the bead width should be equal to or wider than tab 32 but equal to or narrower than gap 30. In an embodiment of the invention, gap 30 and tab 32 are of a contrasting color to the remaining portion of tool 10 to facilitate easy identification of the weld. By way of example only, this contrasting color can be achieved by etching and recessing gap 30 and tab 32 from surface 14, as shown as reference numeral 19a in FIG. 1. The gap 30 and tab 32 may also be recognized by other identifying features, such as a line.

Figure 5:
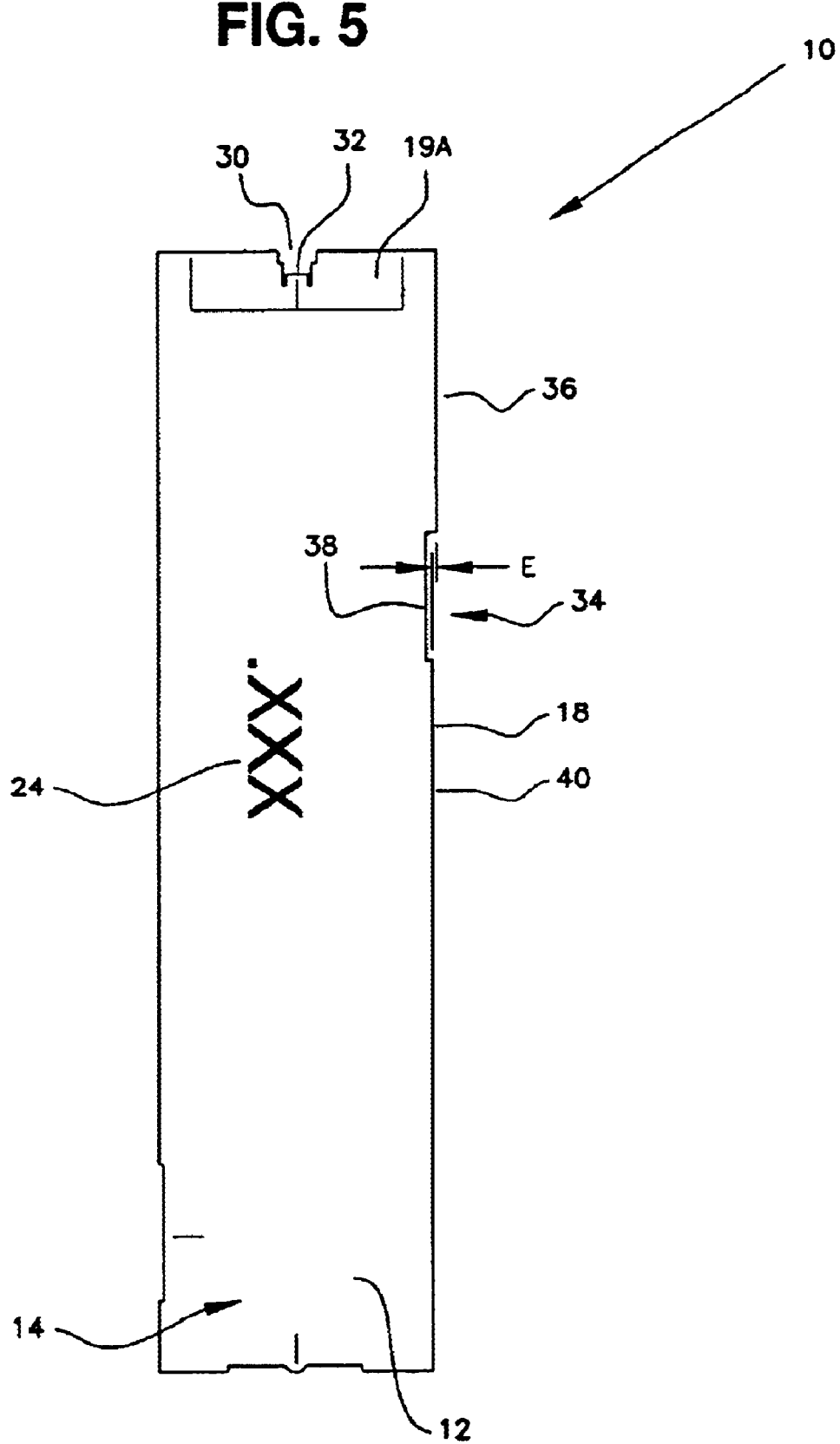
FIG. 5 is a diagram of the axial alignment feature of the measuring and inspection tool.

FIG. 5 shows another embodiment of the present invention specially adapted to inspect and verify bead width and pipe axial alignment. In this embodiment, axial alignment of pipe sections along the pipeline can be verified by using the integrated structure 34. Edge 18 includes an axial alignment gauge 34 having an upper portion 36, a recessed portion 38, and a lower portion 40. Upper portion 36 is higher than lower portion 40 by dimension "e." In the embodiment of the invention, dimension "e" may be substantially equal to ten percent of the associated wall thickness numeral 24. The dimension "e" may, of course, be other percentages of the wall thickness numeral or other fixed dimension. Proper axial alignment can be verified by placing recessed portion 38 across the seam between two sections of pipe. If the pipes are aligned within proper tolerances, tool 10 will rock about the seam. If the pipes are not properly aligned, tool 10 will be unable to rock.

In use, the tool of FIG. 5 should be placed at a minimum of at least two positions over the weld bead in order to determine the axial alignment of the pipes. In a first position, for example, the tool will be placed over the weld bead with the recessed portion 38 positioned over the weld bead. If the tool rocks, the tool will then be rotated 180 degrees with the recessed portion 38 placed over the same position of the weld bead. If the tool still rocks, then it is verified that the pipes are in axial alignment. This same procedure may be used in other locations of the weld bead (preferably at 90 degree increments) in order to determine the axial alignment of the pipes about the diameter thereof. The tool can also be used in the same manner prior to the welding process as a pre-weld inspection for alignment of the adjoining tubes. This procedure assumes that the outside diameters of joined pipes are within tolerances of one another.

Figure 6:
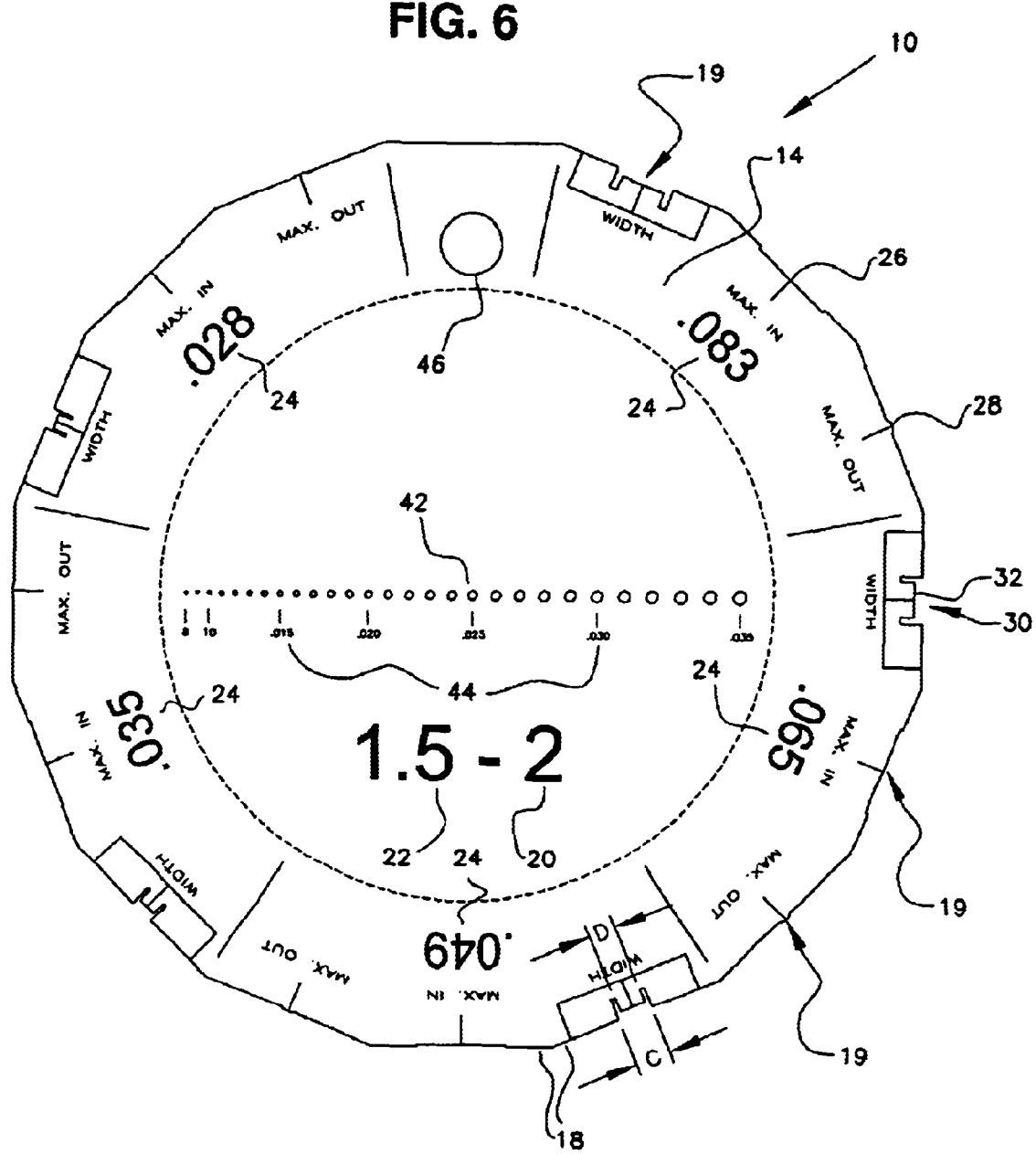
FIG. 6 is an exemplary embodiment of the measuring and inspection tool.

FIG. 6 illustrates a specific example of tool 10 adapted to inspect and verify bead convexity, bead concavity, and bead width for the common wall thicknesses of 0.028 inches, 0.035 inches, 0.049 inches, 0.065 inches, and 0.083 inches, where the ratio of bead width to wall thickness is between 1.5 and 2, inclusive. As shown in FIG. 6, the embodiment of tool 10 also includes several holes 42 of varying diameter as well as corresponding diameter markings 44 imprinted onto surface 14. By inserting the tip of an electrode into successive holes 42, the welder can determine the diameter of the tip. The use of commonly sized tips allows for a constant voltage to be used during the weld process so as to maintain a constant weld bead. Tool 10 can also include a hole 46 that allows tool 10 to be conveniently stored, such as on a keychain, when not in use.

Figure 7:
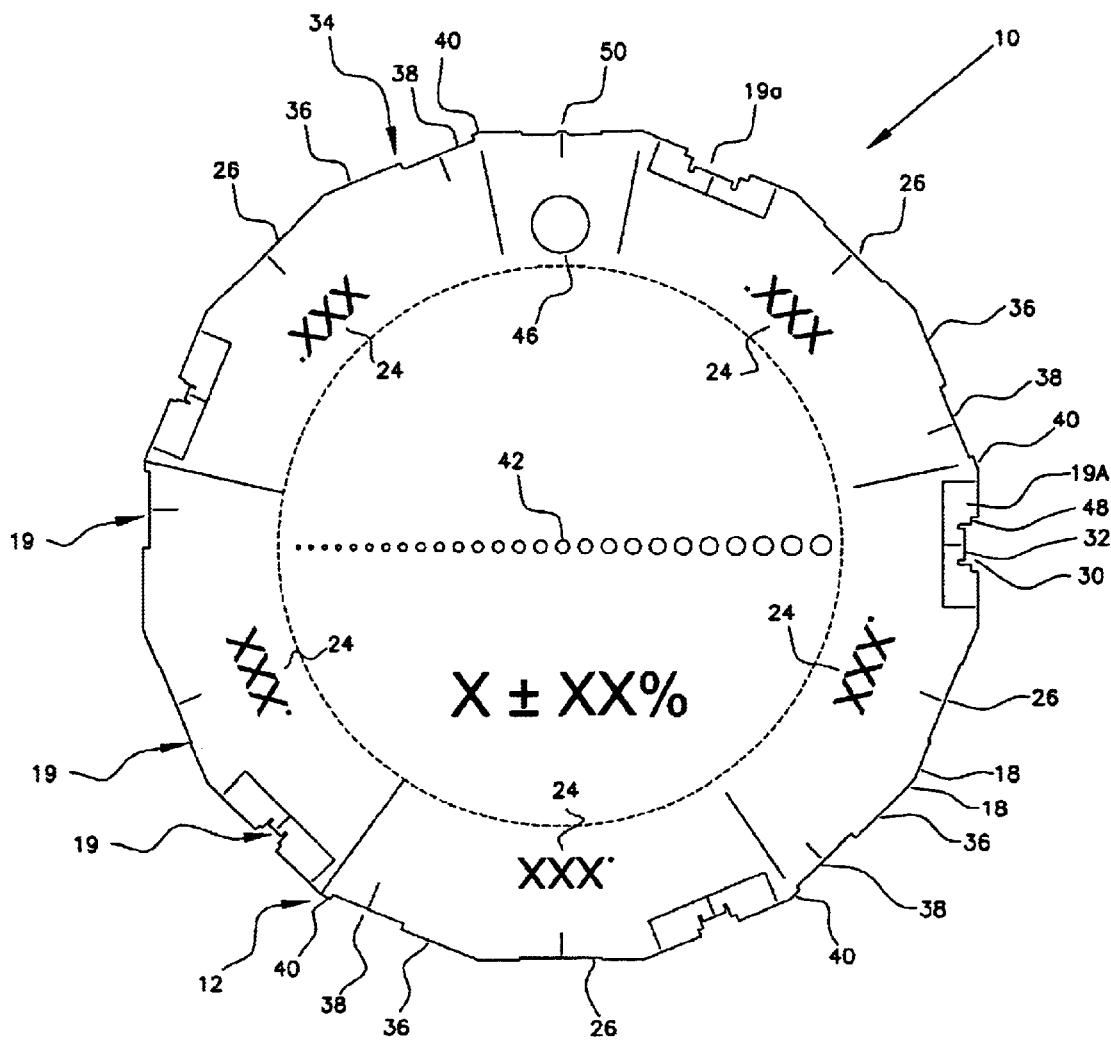
FIG. 7 is a top plan view of another embodiment of the measuring and inspection tool of the present invention.
Figure 8:
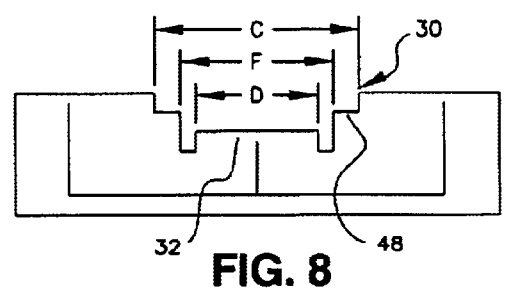
FIG. 8 is an exploded view of a gap, tab, and tolerance step for determining width of the weld beads and the variation thereof.

A second embodiment of the tool 10, which is substantially similar to the embodiments shown in FIGS. 1 and 6, is shown in FIG. 7. For example, each wall thickness numeral 24 is associated with three fixed measurement structures 19, one of which is a convexity measuring notch 26 as shown in FIG. 2 and described above. A second measurement structure 19 is an axial alignment structure 34, as shown in FIG. 5 and described above. A third measurement structure 19 is used to verify the width of the internal weld bead, including gap 30, tab 32, and a tolerance step 48. This width-measuring structure is shown in exploded view in FIG. 8. As described above with reference to FIG. 4, dimensions "c" and "d" denote the maximum and minimum widths of the internal weld bead, respectively. Step 48 indicates the acceptable variation in the width of the weld bead. Dimension "f" may be a fixed percentage variation from dimensions "c" and "d," associated with a predetermined job site specification, or some other appropriate dimension.

Measurement of the bead width via gap 30 and tab 32 is as described above with reference to FIG. 4. To use the modified width measurement structure 19 shown in FIG. 8 to measure bead width variation, gap 30 and tab 32 are placed over the weld bead and moved along its length. If the maximum weld bead width is dimension "c," then the minimum bead width must not be smaller than dimension "f." If the maximum bead width is dimension "f," then the minimum bead width must not be smaller than dimension "d." That is, step 48 acts as a reference gauge allowing the welder to verify not only that the absolute bead width is within proper tolerances, but also that the variation in bead width is within proper tolerances.

FIG. 7 also shows that tool 10 includes a concavity measuring nub 50. Concavity measuring nub 50 functions similarly to tooth 28 (shown in FIG. 3). However, rather than being associated with a particular wall thickness numeral 24, nub 50 is adapted to measure a fixed maximum concavity (e.g., 1/1000 of an inch) for all pipe wall thicknesses.

Figure 7A:
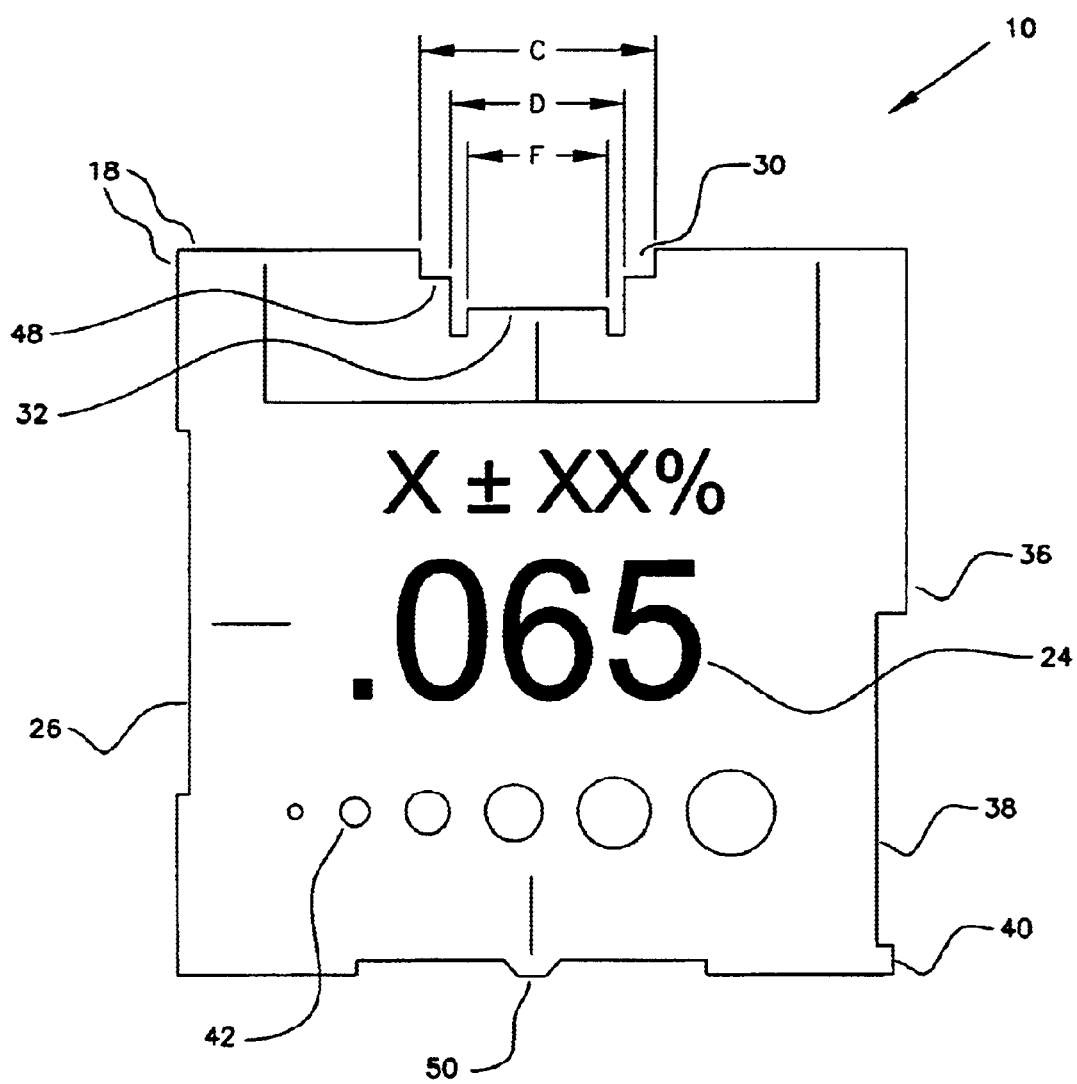
FIG. 7a is a top plan view of a third embodiment of the measuring and inspection tool of the present invention.

A third embodiment of tool 10 is shown in FIG. 7a. This embodiment is similar to the embodiment shown in FIG. 7, but is for use with only a single wall thickness of pipe as indicated by imprinted wall thickness numeral 24. That is, the embodiment of tool 10 shown in FIG. 7a is adapted to measure maximum bead width, minimum bead width, bead width variation, bead concavity, bead convexity, axial tube alignment for a single pipe wall thickness. Tool 10 may also include holes 42 for measuring tip diameters as described above with reference to FIG. 6. This third embodiment of tool 10 is smaller than the embodiments shown in FIGS. 1 and 7, and accordingly may be used in smaller or more confined spaces.

Method of Use

Selection of the proper tool 10 for a particular inspection is based on the desired ratios of weld bead width to pipe wall thickness, which are indicated by maximum and minimum bead width multipliers 20 and 22 imprinted on surface 14. Selection of the proper edges 18 to use for inspection and verification is accomplished by matching the thickness of the pipe wall to one wall thickness numeral 24 imprinted on upper surface 14.

For example, a measurement of a pipe wall will be either measured or known by the welder. Once a thickness of the pipe wall is known, for example, 0.065 inches, the welder will make several coupons in order to determine the best weld parameters. Once several coupons are completed, the welder will cut the pipe along the longitudinal cross section in order to visualize the interior portion of the pipe and more particularly the dimensions of the internal weld beads. The welder will then measure the dimensions of the internal weld using the tool 10. It should be understood that the welder can measure the parameters of the weld bead in any order; however, for illustrative purposes only the measurements of the convexity, concavity, bead width, and axial alignment will be discussed in that order.

Figure 9A:
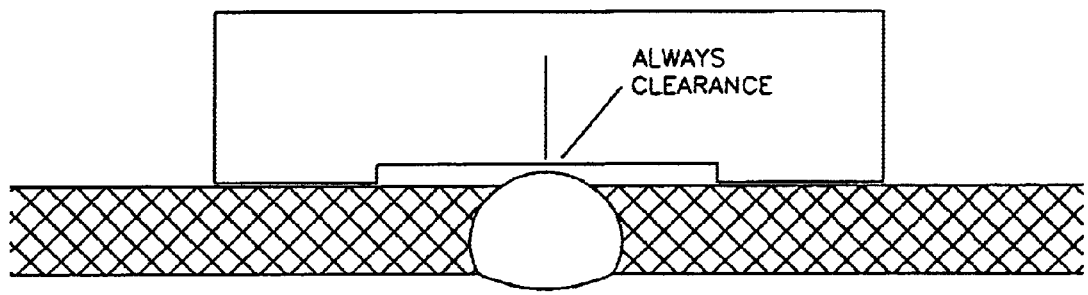
FIG. 9a illustrates measurement of a weld bead with convexity within tolerances.
Figure 9B:
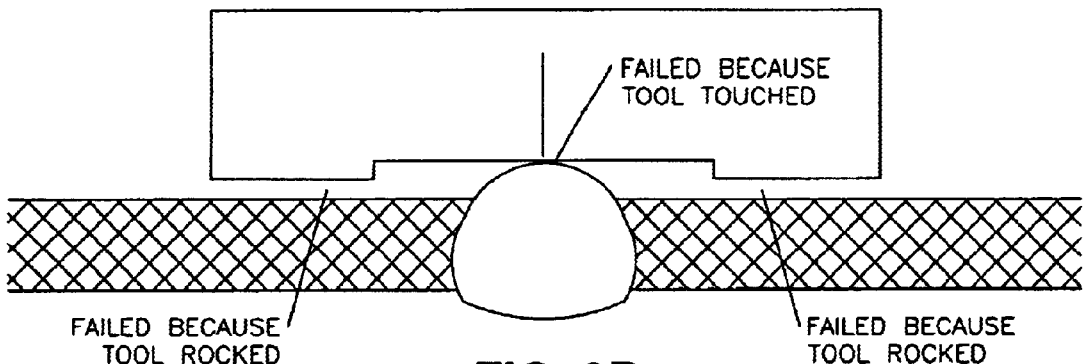
FIG. 9b illustrates measurement of a weld bead with convexity outside of tolerances.

Knowing the wall thickness and minimum and maximum ratios or the predefined fixed dimensions defined by the job specifications, the welder will first determine the proper measurement devices to use associated with the wall thickness on the tool 10. Thereafter, the welder places the associated notch 26 over the weld bead to determine whether the convexity of the weld bead is within prescribed tolerances. If the tool 10 does not rock (i.e., remains stationary) then the convexity of the weld bead is within tolerances. This is shown in FIG. 9a. If tool 10 does rock (i.e., is not stationary), the weld bead convexity is not within the designated tolerances. This is shown in FIG. 9b.

Figure 10A:
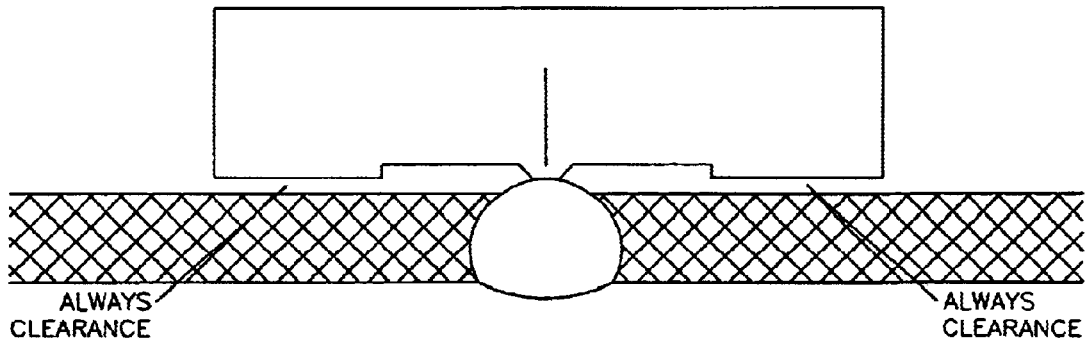
FIG. 10a illustrates measurement of a weld bead with concavity within tolerances.
Figure 10B:
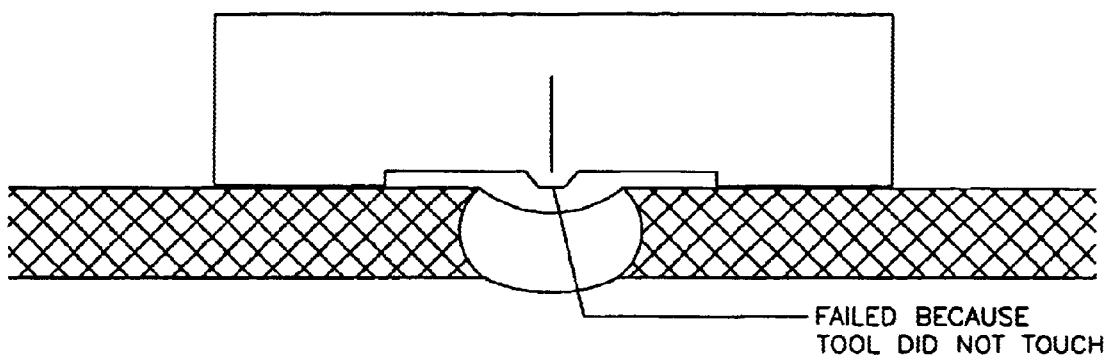
FIG. 10b illustrates measurement of a weld bead with concavity outside of tolerances.

Next, the welder places the associated tooth 28 over the weld bead. If the tool 10 rocks (i.e., is not stationary) then the concavity of the weld bead is within tolerances. This is shown in FIG. 10a. If tool 10 does not rock (i.e., is stationary), then the weld bead concavity is outside of the designated tolerances. This is shown in FIG. 10b.

Figure 11A:
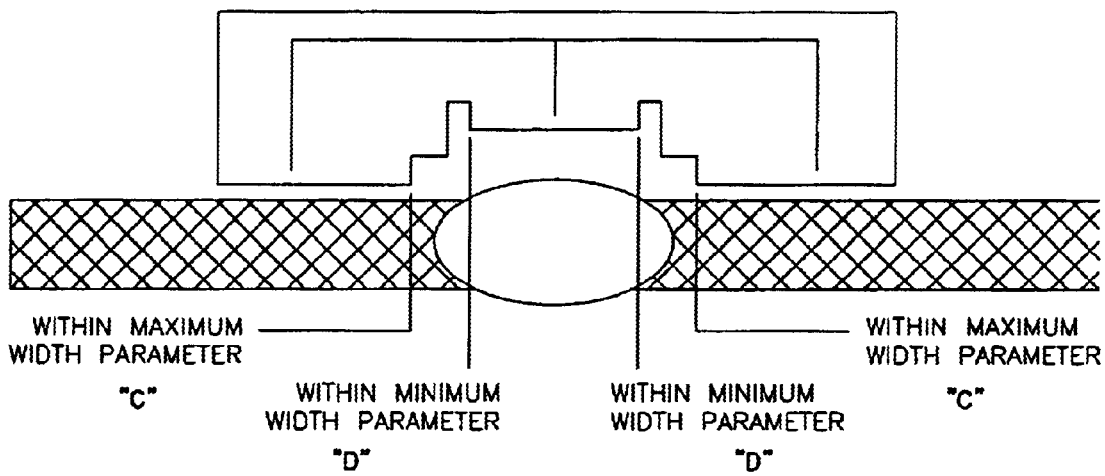
FIG. 11a illustrates measurement of a weld bead with a width inside of tolerances.
Figure 11B:
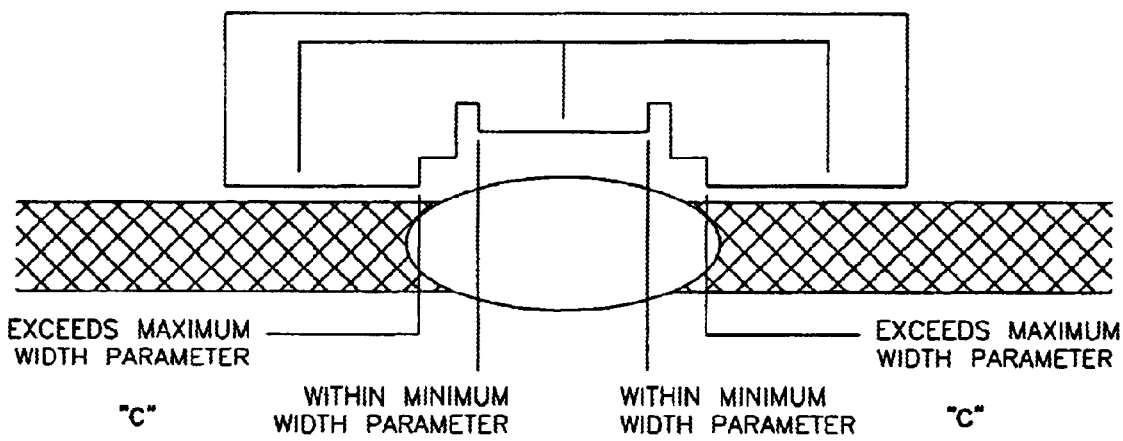
FIG. 11b illustrates measurement of a weld bead that is too wide.
Figure 11C:
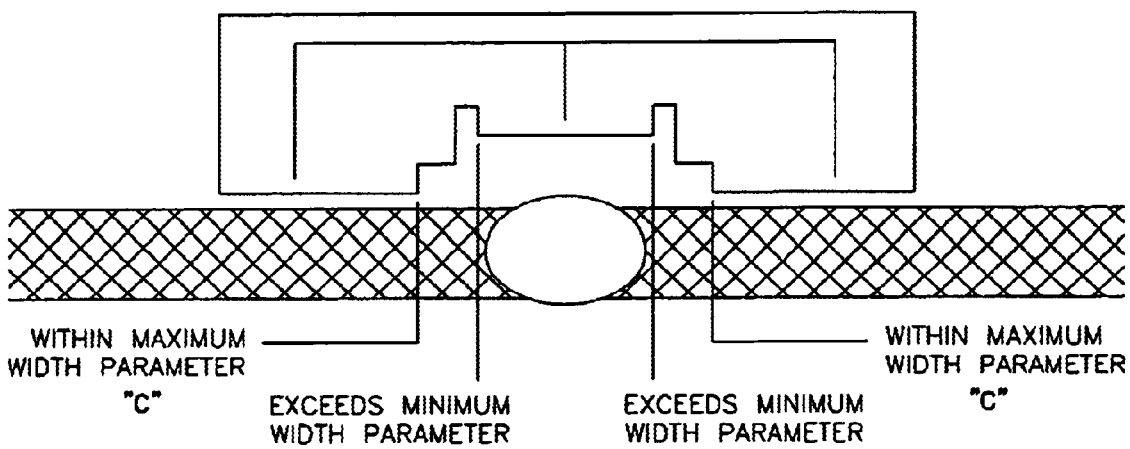
FIG. 11c illustrates measurement of a weld bead that is too narrow.

The welder can then place the associated gap 30 and tab 32 next to the weld bead to determine whether the weld bead width is within tolerances. If the weld bead falls within the dimensions "c" and "d" the welder is then ensured that the bead is within the proper tolerances. This is shown in FIG. 11a. If the weld bead falls outside of dimension "c" (FIG. 11b) or inside of dimension "d" (FIG. 11c), then the weld bead is not within proper width tolerances.

Figure 11D:
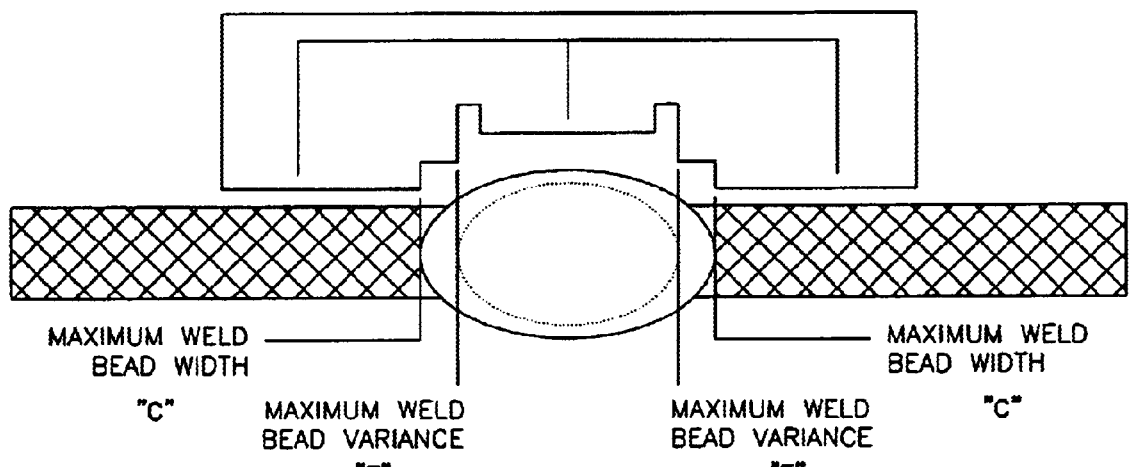
FIG. 11d illustrates measurement of acceptable weld bead width variation where the maximum bead width corresponds to a fixed maximum bead width measurement structure.
Figure 11E:
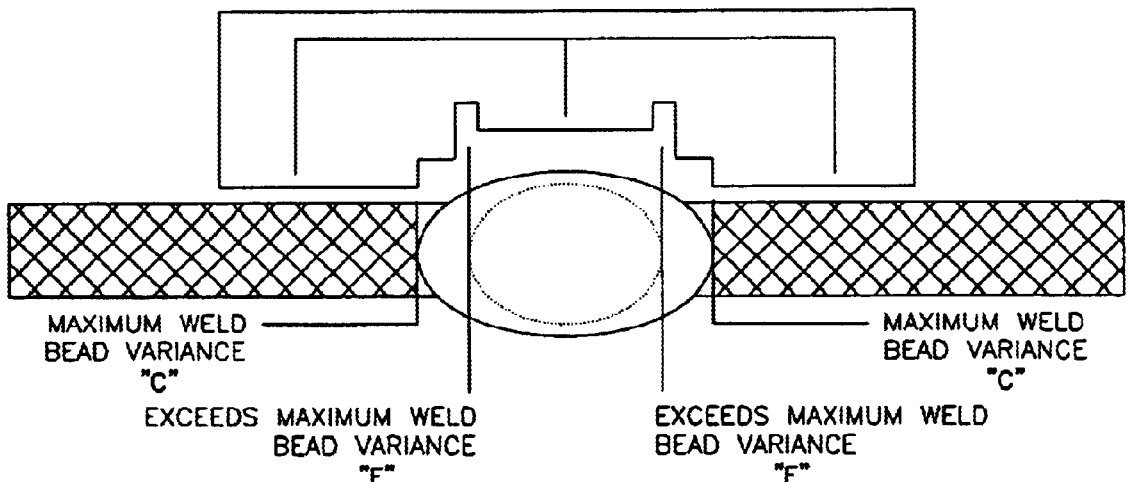
FIG. 11e illustrates measurement of unacceptable weld bead width variation where the maximum bead width corresponds to a fixed maximum bead width measurement structure.
Figure 11F:
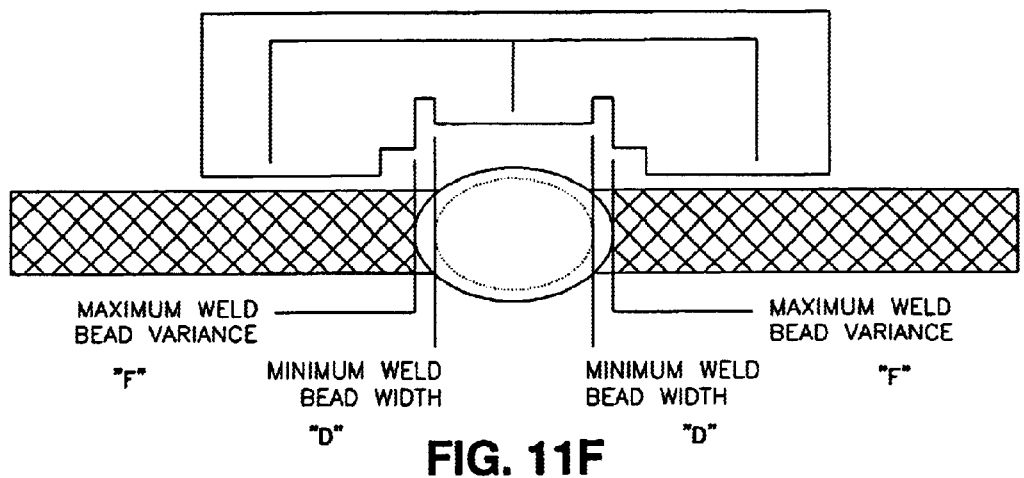
FIG. 11f illustrates measurement of acceptable weld bead width variation where the minimum bead width corresponds to a fixed minimum bead width measurement structure.
Figure 11G:
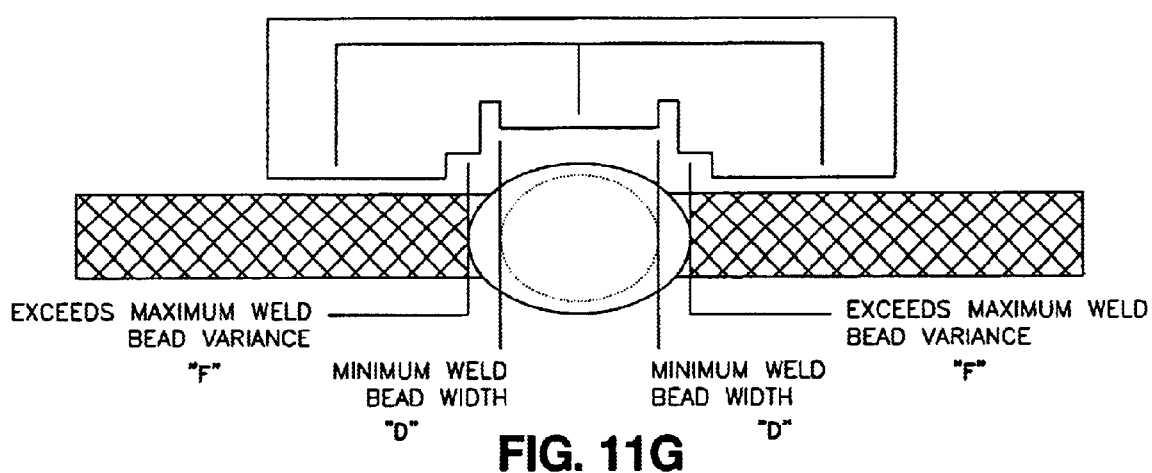
FIG. 11g illustrates measurement of unacceptable weld bead width variation where the minimum bead width corresponds to a fixed minimum bead width measurement structure.
Figure 11H:
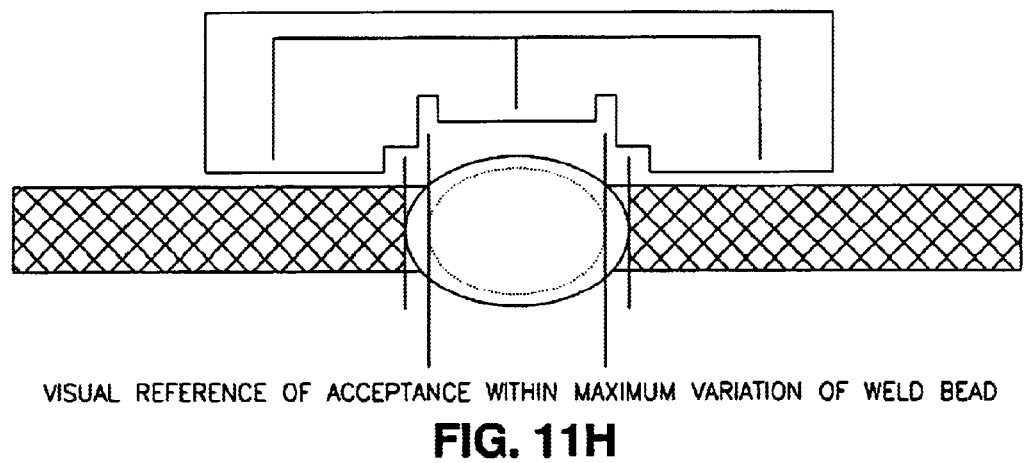
FIG. 11h illustrates use of the tool as a bead width variation reference gauge.

Furthermore, the welder can use step 48 and dimension "f" to verify that the width of the weld bead does not vary beyond proper tolerances. The welder first determines the maximum (or minimum) weld bead width by sliding or intervally placing tool 10 along the weld bead. If the maximum weld bead width corresponds to dimension "c," or the minimum weld bead width corresponds to dimension "f," then the weld bead width must be between dimensions "c" and "f" at all points. Even more specifically, if the maximum weld bead width corresponds to dimension "c," then the minimum weld bead width cannot fall below the dimension "f." This is shown in FIG. 11d, while an unacceptable weld is shown in FIG. 11e. If the maximum weld bead width corresponds to dimension "f," or the minimum weld bead width corresponds to dimension "d," then the weld bead width must be between dimensions "d" and "f" at all points. Even more specifically, if the minimum weld bead width corresponds to dimension "d," then the maximum weld bead width cannot fall outside of dimension "f." This is shown in FIG. 11f, while an unacceptable weld is shown in FIG. 11g. If the maximum and minimum do not correspond to any of dimensions "c," "d," or "f," gap 30, tab 32, and step 48 serve as reference gauges only, as shown in FIG. 11h.

Figure 12A:
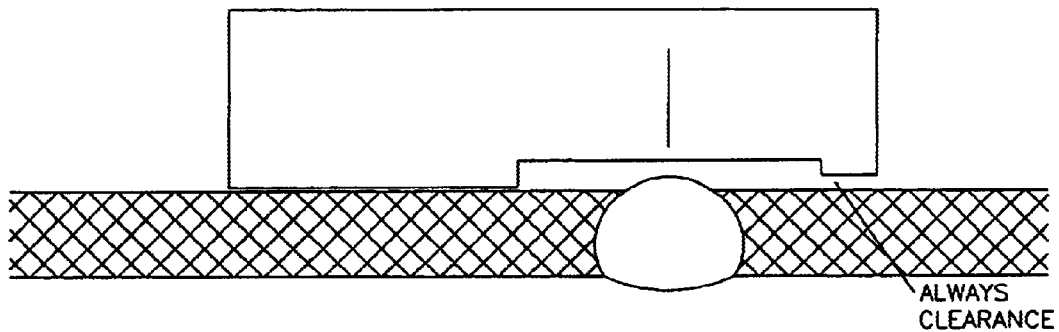
FIG. 12a illustrates measurement of acceptable axial alignment of tubes.
Figure 12B:
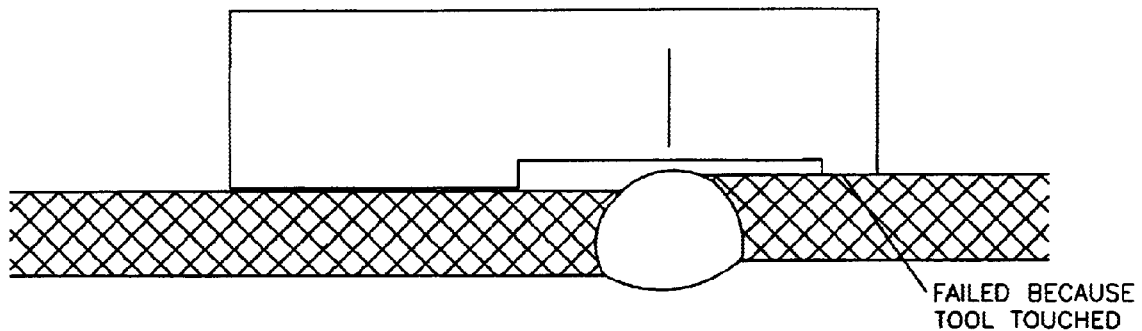
FIG. 12b illustrates measurement of unacceptable axial alignment of tubes.

Finally, the welder places tool 10 at a minimum of at least two positions over the weld bead in order to determine the axial alignment of the pipes. In a first position, for example, tool 10 is placed over the weld bead with recessed portion 38 positioned over the weld bead. If the tool rocks (i.e., is not stationary), as shown in FIG. 12a, the tool will then be rotated 180 degrees with the recessed portion 38 placed over the same position of the weld bead. If the tool still rocks, then it is verified that the pipes are in axial alignment. If tool 10 does not rock (i.e., is stationary) in either position, then the alignment is unacceptable. This same procedure may be used in other locations of the weld bead (preferably at 90 degree increments) in order to determine the axial alignment of the pipes about the diameter thereof. This procedure assumes that the outside diameters of joined pipes are within tolerances of one another.

After these measurements are taken by the welder, the welder can then calibrate the welding machine to the most accurate weld coupon. This procedure allows the welder to visualize the weld bead and make a determination as to whether the weld bead is within certain preset parameters without any complex formulas or tools.

While the invention has been described in terms of its embodiments, those skilled in the art will recognize that the invention can be practiced with modification within the spirit and scope of the appended claims. For example, it should be obvious to one skilled in the art that the tool can be adapted to any tolerances or standards for welds utilizing any pipe wall thickness and ratios or a fixed set of dimensions.

What is claimed is:

1. A tool for measuring and inspecting weld beads, comprising:
    a plate having a surface and a plurality of edges;
    at least one wall thickness numeral imprinted onto said surface, said at least one wall thickness numeral corresponding with a wall thickness of a pipe; and
    at least one fixed maximum measurement structure integrated with an edge of the plurality of edges of said plate and associated with said at least one wall thickness numeral, said at least one fixed maximum measurement structure measuring a weld bead parameter based on said at least one wall thickness numeral.

2. The tool according to claim 1, wherein said maximum measurement structure comprises a concavity measuring tooth protruding from said edge.

3. The tool according to claim 2, wherein said concavity measuring tooth protrudes from said edge by a distance equal to a percent of said wall thickness numeral.

4. The tool according to claim 2, wherein said concavity measuring tooth protrudes from said edge by a predetermined fixed distance.

5. The tool according to claim 1, wherein said maximum measurement structure further comprises a convexity measuring notch in said edge.

6. The tool according to claim 5, wherein said convexity measuring notch has a depth equal to a percent of said wall thickness numeral.

7. The tool according to claim 5, wherein said convexity measuring notch has a depth substantially equal to a predetermined fixed depth.

8. The tool according to claim 1, further comprising a maximum bead width multiplier imprinted onto said surface and a minimum bead width multiplier imprinted onto said surface.

9. The tool according to claim 8, wherein said maximum measurement structure is a maximum and minimum measurement structure for measuring a bead width.

10. The tool according to claim 9, wherein said maximum and minimum measurement structure is a gap and a tab disposed within said gap both along said edge.

11. The tool according to claim 10, wherein:
said gap has a width substantially equal to said wall thickness numeral multiplied by said maximum bead width multiplier, and
said tab has a width substantially equal to said wall thickness numeral multiplied by said minimum bead width multiplier.

12. The tool according to claim 10, wherein said gap and tab are of a contrasting color to said tool or distinguishing indicia.

13. The tool according to claim 1, wherein said maximum measurement structure further comprises an axial alignment gauge disposed along said edge.

14. The tool according to claim 13, wherein said axial alignment gauge comprises an upper portion, a lower portion, and a recess disposed between said upper and lower portions.

15. The tool according to claim 14, wherein said upper portion extends above said lower portion by a distance equal to a percent of said wall thickness numeral.

16. The tool according to claim 14, wherein said upper portion extends above said lower portion by a predetermined fixed distance.

17. The tool according to claim 1, further comprising a plurality of holes of varying diameter through said surface and a plurality of diameter markings corresponding to said holes imprinted onto said surface, said plurality of holes adapted to measure a tungsten flat.

18. The tool according to claim 1, wherein said at least one fixed maximum measurement structure includes a second fixed maximum measurement structure integrated with a second edge of said plurality of edges.

19. The tool according to claim 18, wherein said at least one fixed maximum measurement structure includes a third fixed maximum measurement structure integrated with a third edge of said plurality of edges.

20. The tool according to claim 19, wherein:
said at least one fixed maximum measurement structure measures a concavity of the weld bead using a tooth;
said second fixed maximum measurement structure measures a convexity of the weld bead using a notch; and
said third fixed maximum measurement structure is a maximum and minimum measurement structure which measures a weld bead width using a gap and corresponding tab.

21. The tool according to claim 19, wherein said at least one, second, and third fixed maximum measurement structures are associated with said at least one wall thickness numeral imprinted onto said surface.

22. The tool according to claim 1, further comprising at least a second wall thickness numeral imprinted onto said surface.

23. The tool according to claim 1, wherein:
said at least one wall thickness numeral imprinted onto said surface is at least two or more wall thickness numerals imprinted on said surface;
said at least one fixed maximum measurement structure includes a set of maximum measurement structures associated with each of the at least one wall thickness numerals imprinted onto said surface; and
said set of maximum measurement structures associated with each of the at least one wall thickness numerals includes:
a weld bead concavity measurement device;
a weld bead convexity measurement device; and
a weld bead width measurement device.

24. The tool according to claim 1, wherein said maximum measurement structure is a maximum and minimum structure for measuring a bead width having a gap and a tab disposed within said gap both along said edge, said gap and said tab having a width substantially equal to a predetermined width specification associated with the at least one wall thickness numeral.

25. A tool for measuring and inspecting weld beads, comprising:
a plate having a surface and a plurality of edges;
at least one wall thickness numeral imprinted onto said surface, said at least one wall thickness numeral corresponding with a wall thickness of a pipe;
a first fixed maximum measurement structure integrated with a first edge of said plurality of edges and associated with said at least one wall thickness numeral; and
a second fixed maximum measurement structure integrated with a second edge of said plurality of edges and associated with said at least one wall thickness numeral,
wherein said first fixed maximum measurement structure measures a first parameter of the weld beads and a second fixed maximum measurement structure measures a second parameter of the weld beads.

26. The tool according to claim 25, further comprising a third fixed maximum measurement structure integrated with a third edge of said plurality of edges and associated with said at least one wall thickness numeral, said third fixed maximum measurement structure measuring a third weld bead parameter based on said at least one wall thickness numeral.

27. The tool according to claim 26, wherein:
said first parameter is a weld bead concavity;
said second parameter is a weld bead convexity; and
said third parameter is a weld bead width measurement.

28. A tool for measuring and inspecting weld beads, comprising:
a plate having a surface and a plurality of edges; and
at least one fixed measurement structure integrated with at least one edge of the plurality of edges of said plate, said at least one fixed measurement structure measuring a maximum weld bead width, a minimum weld bead width, and a tolerance variation of weld bead width, the tolerance variation of weld bead width being based on predetermined, fixed tolerances for weld bead width maxima and minima.

29. The tool according to claim 28, further comprising a concavity measuring nub integrated with an edge of said plate.

30. The tool according to claim 28, wherein said at least one fixed maximum measurement structure is a gap, step, and tab disposed within said gap along said edge.

31. The tool according to claim 30, wherein:
said gap has a predetermined width corresponding to a maximum allowable bead width;
said tab has a predetermined width corresponding to a minimum allowable bead width; and
said step has a width corresponding to a predetermined tolerance variation from said predetermined gap and tab widths.

32. The tool according to claim 28, further comprising at least one fixed maximum measurement structure integrated with at least one edge of said plate, said at least one maximum measurement structure measuring at least one weld bead parameter selected from the group consisting of weld bead convexity and axial alignment.

33. A method of measuring and inspecting weld beads, comprising the steps of:

provrding a tool for measuring and inspecting weld beads, said tool including at least one fixed measurement structure;

placing said fixed measurement structure on a weld bead; and determining whether the tool rocks about the weld bead.

34. The method according to claim 33, wherein said step of placing said fixed measurement structure on a weld bead comprises placing a convexity measuring notch on the weld bead.

35. The method according to claim 33, wherein said step of placing said fixed measurement structure on a weld bead comprises placing a concavity measuring tooth on the weld bead.

36. The method according to claim 33, wherein said step of placing said fixed measurement structure on a weld bead comprises placing a recess disposed between an upper portion and a lower portion on the weld bead.

37. The method according to claim 33, further comprising the step of determining whether a width of the weld bead is between fixed maximum and minimum measuring structures on said fixed measurement structure.

38. The method according to claim 37, further comprising the step of determining whether the width of the weld bead does not vary excessively.

39. The method according to claim 38, wherein said step of determining whether the width of the weld bead does not vary excessively further comprises the steps of:

sliding the tool along the weld bead; and determining whether the width of the weld bead varies beyond a tolerance structure on said fixed measurement structure.

40. A method of measuring and inspecting weld bead widths, comprising the steps of:

providing a tool for measuring and inspecting weld beads, said tool including at least one fixed measurement structure, said at least one fixed measurement structure comprising:

a fixed bead width maximum measurement structure;

a fixed bead width minimum measurement structure; and a fixed bead width tolerance variation measurement structure, said fixed bead width tolerance variation measurement structure located based on predetermined, fixed tolerances for weld bead width maxima and minima;

placing said fixed measurement structure on a weld bead;

determining whether a maximum weld bead width exceeds said fixed bead width maximum measurement structure;

determining whether a minimum weld bead width exceeds said fixed bead width minimum measurement structure; and verifying that the width of the weld bead does not vary excessively.

41. The method according to claim 40, wherein said step of verifying that the width of the weld bead does not very excessively further comprises the steps of:

locating a first weld bead width extreme;

sliding the tool along the weld bead; and determining whether the width of the weld bead varies beyond said fixed bead width tolerance variation measurement structure.

* * * * *

UNITED STATES PATENT AND TRADEMARK OFFICE
CERTIFICATE OF CORRECTION

PATENT NO. : 6,637,121 B2
DATED : October 28, 2003
INVENTOR(S) : Byron G. Barefoot It is certified that error appears in the above-identified patent and that said Letters Patent is hereby corrected as shown below:

Column 12,
Line 29, change "very" to -- vary --.

Signed and Sealed this

Sixth Day of January, 2004

JAMES E. ROGAN
*Director of the United States Patent and Trademark Office*